(12) United States Patent
Myono

(10) Patent No.: US 6,693,808 B2
(45) Date of Patent: Feb. 17, 2004

(54) CONTROL METHOD OF DC-DC CONVERTER

(75) Inventor: Takao Myono, Menuma-Machi (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 10/244,775

(22) Filed: Sep. 16, 2002

(65) Prior Publication Data
US 2003/0058669 A1 Mar. 27, 2003

(30) Foreign Application Priority Data
Sep. 26, 2001 (JP) ........................................ 2001-294116

(51) Int. Cl.[7] ................................................. H02M 3/06
(52) U.S. Cl. ....................................................... 363/62
(58) Field of Search ............................ 363/59, 60, 62; 307/109, 110; 327/535, 536

(56) References Cited

U.S. PATENT DOCUMENTS 4,531,106 A  *  7/1985  Ganesan ...................... 333/173
6,198,645 B1  *  3/2001  Kotowski et al. .............. 363/59
6,304,007 B1  * 10/2001  Yu ............................... 307/110

* cited by examiner

Primary Examiner—Matthew V. Nguyen
(74) Attorney, Agent, or Firm—Fish & Richardson P.C.

(57) ABSTRACT

A DC—DC converter capable of generating an output voltage in increments of less than power supply voltage Vdd is provided. A power supply voltage Vdd is provided to a three-stage switched capacitor type DC—DC converter. A first stage of the DC—DC converter comprises two capacitors C11 and C12 and switches 61, 62 and 63, that alternate a connection of the capacitors C11 and C12. The capacitors C11 and C12 are connected in series when charging by turning the switch 61 ON, while the capacitors C11 and C12 are connected in parallel when discharging by turning the switches 62 and 63 ON. Thus a boosted voltage of 3.5 Vdd is obtained from an output terminal 40.

6 Claims, 10 Drawing Sheets

CONTROL METHOD OF DC-DC CONVERTER

BACKGROUND OF THE INVENTION

The present invention relates to a DC—DC converter suitable for a power supply circuit, specifically to a DC—DC converter with an improved efficiency.

Video equipments in recent years such as a camcorder, a digital still camera (DSC) and a mobile phone with DSC use charge-coupled devices (CCDs) to capture an image. A power supply circuit that provides both positive and negative high voltages (over 10 volts) and high current (several milliamperes) is required in order to drive the CCDs. A switching regulator is used for that purpose today.

The switching regulator can generates the high voltages with high performance, i.e. with high power efficiency. However it has a drawback to generates a harmonic noise when switching a current, and therefore the power supply has to be used with a noise shield. Another drawback with the switching regulator is a difficulty in reducing the size of the equipment, since it requires a coil as an external part.

Switched capacitor type DC—DC converters have been proposed in order to overcome the drawbacks mentioned above. An example of the DC—DC converters of the kind is reported in the Journal of Institute of Electronics, Information and Communication Engineers (C-2 Vol.J81-C-2 No.7 pp. 600–612, July 1998).

FIG. 9 and FIG. 10 are circuit diagrams of a switched capacitor type DC—DC converter of the prior art. A voltage source 10 provides a supply voltage Vdd. Each of the capacitors C1, C2 and C3 composes each stage of the DC—DC Converter. Each of switches 11, 12 and 13 is connected between the power supply Vdd and one end of each of the capacitors respectively, and each of switches 21, 22 and 23 is connected between a ground (0V) and the other end of each of the capacitors respectively.

A switch 30 is disposed between the power supply Vdd and a ground (0V) side end of the capacitor C1. A switch 31 is disposed between a Vdd side end of the capacitor C1 and a ground (0V) side end of the second stage capacitor C2. A switch 32 is disposed between a Vdd side end of the capacitor C2 and a ground (0V) side end of the third stage capacitor C3. A switch 33 is disposed between a Vdd side end of the capacitor C3 and an output terminal 40. Cout is an output capacitor. A current load 50 is connected to the output terminal 40. Operation of this three-stage DC—DC converter will be described hereafter.

The switches 11–13 and 21–23 are turned ON, and the switches 30–33 are turned OFF, as shown in FIG. 9. The capacitors C1–C3 are connected in parallel between the power supply Vdd and the ground (0V). Each of voltages V1–V3 of each of the respective capacitors C1–C3 is charged to Vdd. Given that an output current from the output terminal 40 is Iout, a charging current to each of the capacitors is 2 Iout.

Next, as shown in FIG. 10, the switches 11–13 and the switches 21–23 are turned OFF, and the switches 30–33 are turned ON. Then the capacitors C1–C3 are connected in series with each other while they are disconnected from the power supply Vdd and the ground (0V), and discharging takes place. The voltage V1 is boosted to 2 Vdd, the voltage V2 is boosted to 3 Vdd and the voltage V3 (=Vout) is boosted to 4 Vdd, due to a capacity coupling effect. Given that the output current from the output terminal 40 is Iout, a current from the power supply Vdd to the capacitor C1 is 2 Iout.

As described above, the switched capacitor type DC—DC converter generates as high voltage as 4 Vdd from the output terminal 40 when provided with the power supply voltage of Vdd.

A theoretical efficiency η of a DC—DC converter is defined as output power/input power. Assuming that duration of a status of FIG. 9 and duration of a status of FIG. 10 are equal, and neglecting all voltage loss due to the switches and other factors, Input power=4×2 Iout/2×Vdd=Iout×4 Vdd
Output power=Iout×4 Vdd Therefore the theoretical efficiency η is 100%.

In general, n-stage switched capacitor type DC—DC converter provides an output voltage of (n+1) Vdd.

However the conventional switched capacitor type DC—DC converter provides a boosted voltage in increments of Vdd only. When the switched capacitor type DC—DC converter is used as a power supply circuit, a step-down voltage adjustment is made by a regulator in order to adjust the output voltage to a desired voltage. A drawback of this method is a decline in the efficiency of the power supply circuit, especially when the discrepancy between the desired voltage and the output voltage of the DC—DC converter of (n+1) Vdd is large.

SUMMARY OF THE INVENTION

An objective of this invention is to improve the efficiency of a power supply circuit by providing a DC—DC converter capable of generating a boosted voltage in increments of less than a supply voltage of Vdd, for instance, 1.5 Vdd, 2.5 Vdd or 3.5 Vdd.

The DC—DC converter of this invention comprises a plurality of stages, each of which has a first capacitor, a first switch to connect the capacitor to a power supply to charge the capacitor and a second switch to connect the capacitor to a capacitor in a next stage. At least one of the stages has a plurality of second capacitors, a third switch to connect the second capacitors in series and a fourth switch to connect the capacitors in parallel.

Since the second capacitors are connected in series during charging, each of the second capacitors is charged to a divided voltage (0.5 Vdd when two capacitors are disposed, for instance). And then the divided voltage is transferred to the next stage by a capacity coupling, as the second capacitors are connected in parallel during discharging. By doing so, it is made possible to generate an output voltage in increments of less than the supply voltage Vdd, for example, 1.5 Vdd, 2.5 Vdd or 3.5 Vdd.

Also it is possible to prevent deterioration in the efficiency of the DC—DC converter by turning OFF the second, third and fourth switches when the first switches make switching so that a reverse current is prevented.

DETAILED DESCRIPTION OF THE INVENTION

Figure 1:
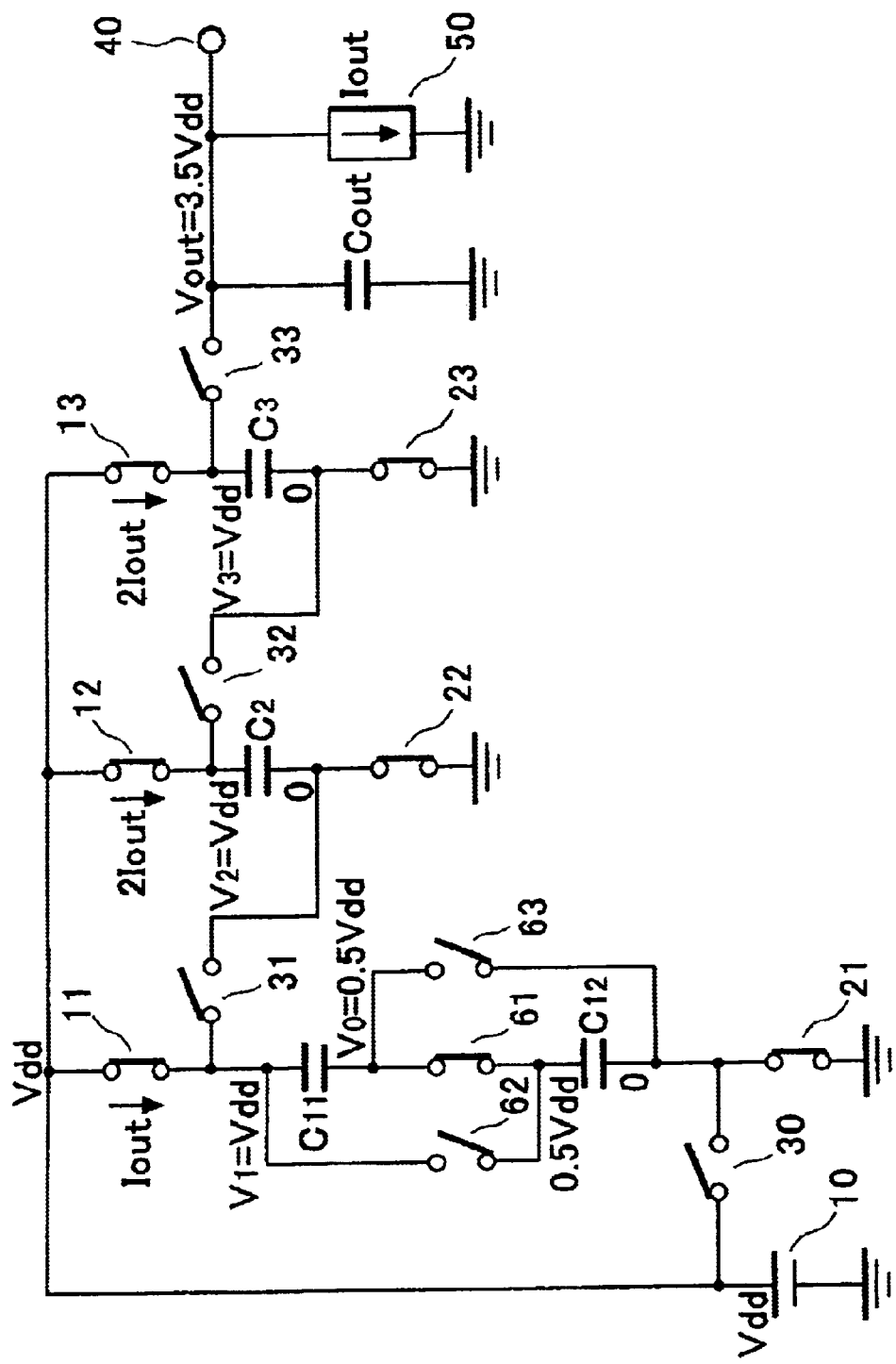
FIG. 1 is a circuit diagram showing a DC—DC converter according to a first embodiment of the invention.
Figure 2:
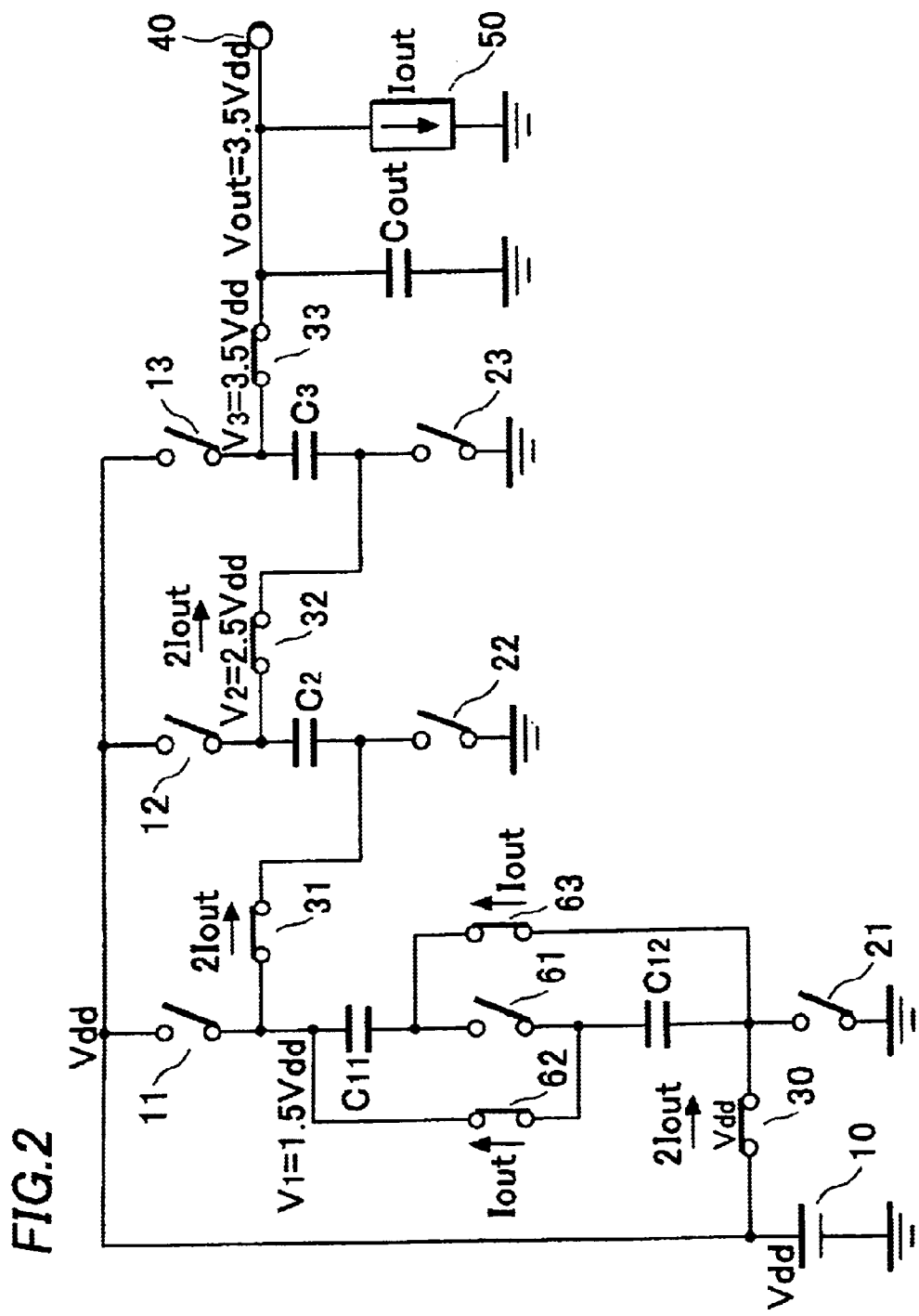
FIG. 2 is a circuit diagram showing the DC—DC converter according to the first embodiment of the invention.

Each of embodiments of the invention will be described hereinafter referring to the drawings. FIG. 1 and FIG. 2 are circuit diagrams showing a three-stage switched capacitor type DC—DC converter according to a first embodiment of this invention.

A voltage source 10 provides a supply voltage Vdd. Switches 61, 62 and 63 alternate connection of capacitors C11 and C12 in series and in parallel. When the switch 61 is ON and the switches 62 and 63 are OFF, the capacitors C11 and C12 are connected in series. The capacitors C11 and C12 are connected in parallel when the switch 61 is OFF and the switches 62 and 63 are ON. Capacitors in this configuration like as C11 and C12 are called series/parallel capacitors hereinafter.

A switch 11 is disposed between the power supply Vdd and one end of the capacitor C11. A switch 21 is disposed between the ground (0V) and one end of the capacitor C12.

Capacitors C2 and C3 compose a second stage and a third stage of the DC—DC converter respectively. Switches 12 and 13 are disposed between the power supply Vdd and one end of each of the capacitors C2 and C3 respectively. Switches 22 and 23 are disposed between the ground (0V) and the other end of each of the capacitors C2 and C3 respectively.

The above-mentioned switches 11–13 and 21–23 compose a group of charging switches to connect the capacitors C11, C12, C2 and C3 to the power supply Vdd and the ground (0V).

A switch 30 is disposed between the power supply Vdd and the ground (0V) side end of the capacitor 12. A switch 31 is disposed between the Vdd side end of the capacitor C11 and the ground (0V) side end of the capacitor C2 of the second stage. A switch 32 is disposed between the Vdd side end of the capacitor C2 and the ground (0V) side end of the capacitor C3 of the third stage. A switch 33 is disposed between the Vdd side end of the capacitor C3 and an output terminal 40. An output capacitance Cout and a current load 50 are connected to the output terminal 40.

The above-mentioned switches 30–33 compose a group of discharging switches to connect the capacitors C11, C12, C2 and C3 in series.

The DC—DC converter can be integrated in an IC by implementing the switches 11–13, 21–23, 30–33 and 61–63 with MOS transistors.

Figure 3:
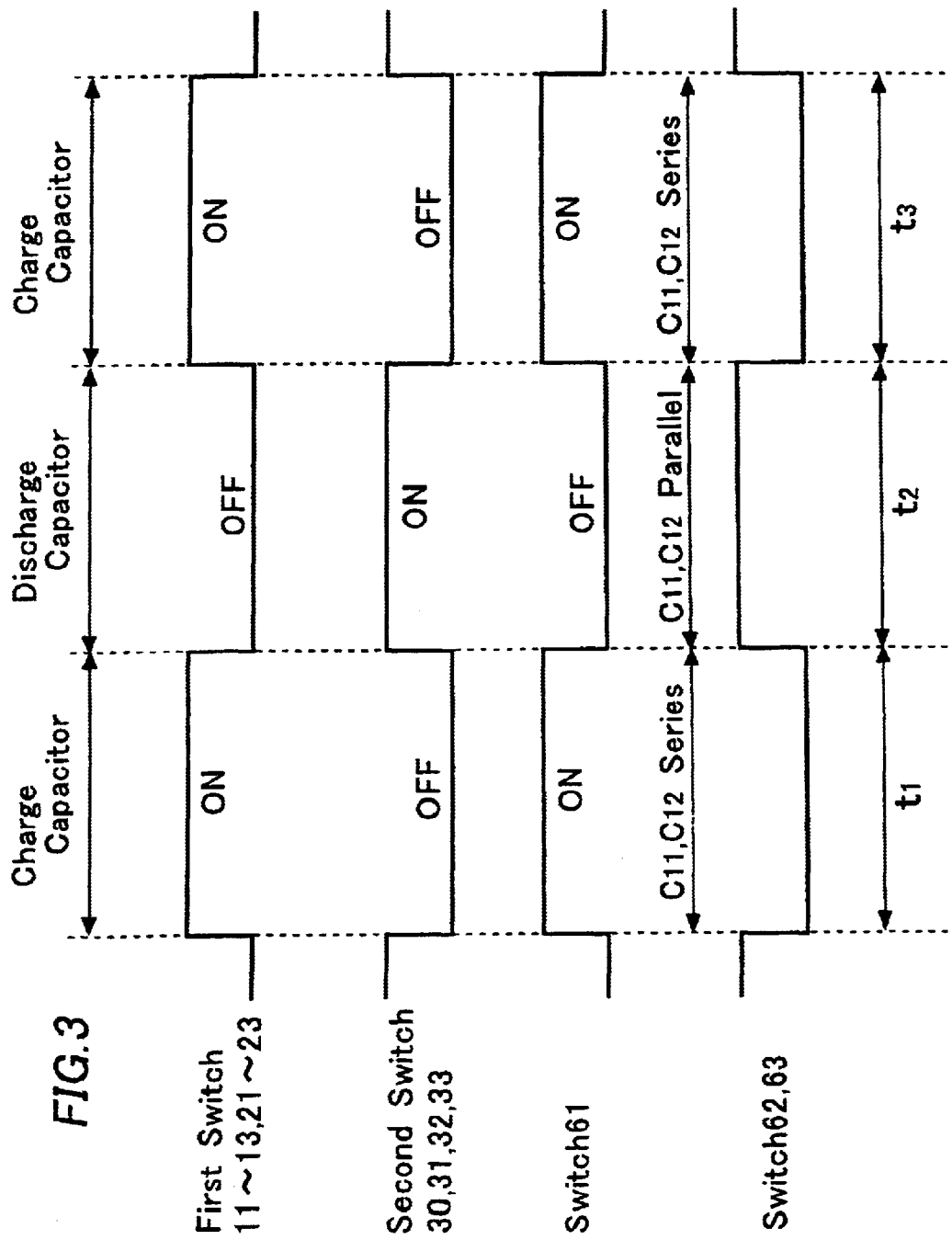
FIG. 3 is a timing chart to explain a first example of operation of the DC—DC converter according to the first embodiment of the invention.

Next, a first example of operation of the switched capacitor type DC—DC converter of the configuration described above will be explained referring to FIG. 1, FIG. 2 and FIG. 3. FIG. 3 is a timing chart to explain the first example of operation of the switched capacitor type DC—DC converter.

The switches 11–13 and the switches 21–23 are turned ON and the switches 30–33 are turned OFF. At the same time the switch 61 is turned ON and the switches 62 and 63 are turned OFF as shown in FIG. 1.

Then the capacitors C11 and C12 are connected in series between the power supply Vdd and the ground (0V), and charging takes place. The capacitors C2 and C3 are connected in parallel between the power supply Vdd and the ground (0V), and charging takes place.

A voltage V0 at a connecting node of the capacitors C11 and C12 becomes 0.5 Vdd, while a voltage V1 at the Vdd side end of the capacitor C11 becomes Vdd. That is to say, each of the capacitors C11 and C12 is charged to 0.5 Vdd, assuming that the capacitors C11 and C12 are equal in capacitance. In case the capacitors C11 and C12 are unequal in capacitance, the voltage V0 at the connecting node of the capacitors C11 and C12 would not be 0.5 Vdd, instead it would be a voltage determined by a ratio of the two capacitors.

Both a voltage V2 across the capacitor C2 and a voltage V3 across the capacitor C3 are Vdd. Given a current from the output terminal 40 is Iout, a charging current to C11 and C12 is Iout, and each of a charging current to C2 and a charging current to C3 is 2 Iout.

Next, the switches 11–13 and the switches 21–23 are turned OFF and the switches 30–33 are turned ON. At the same time, the switch 61 is turned OFF and the switches 62 and 63 are turned ON as shown in FIG. 2.

Then the capacitors C11, C12, C2 and C3 are disconnected from the power supply Vdd and the ground (0V). At the same time, the capacitors C11 and C12 connected in parallel with each other, the capacitor C2 and the capacitor C3 are connected in series, and discharging takes place.

The voltage V1 at the Vdd side end of the capacitor C11 becomes 1.5 Vdd due to a capacity coupling effect. This is because the supply voltage Vdd is added to the voltage 0.5 Vdd at the connecting node of the capacitor C11 and the capacitor C12. Similarly, the voltage V2 is boosted to 2.5 Vdd and the voltage V3 (=Vout) is boosted to 3.5 Vdd due to the capacity coupling effect.

Given the output current from the output terminal 40 is Iout, a current from the power supply to each of the capacitors C11 and C12 is Iout.

The efficiency of the switched capacitor type DC—DC converter is considered next. Assuming that duration of a status of FIG. 1 and duration of a status of FIG. 2 are equal, that is to say, t1, t2 and t3 in FIG. 3 are all equal, and neglecting all voltage loss due to the switches and other factors, Input power=(3×2 Iout+Iout)/2×Vdd=Iout×3.5 Vdd Output power=Iout×3.5 Vdd Therefore, the theoretical efficiency η is 100%.

An n-stage switched capacitor type DC—DC converter outputs a voltage of (n+0.5) Vdd. The n-stage switched capacitor type DC—DC converter can also outputs a voltage of (n+1) Vdd when the capacitors C11 and C12 of the first stage are connected always in series. Therefore the DC—DC converter can generate the output voltage in increments of 0.5 Vdd such as 1.5 Vdd, 2 Vdd, 2.5 Vdd, 3 Vdd, 3.5 Vdd and so on, with the theoretical efficiency η of 100%.

Figure 4:
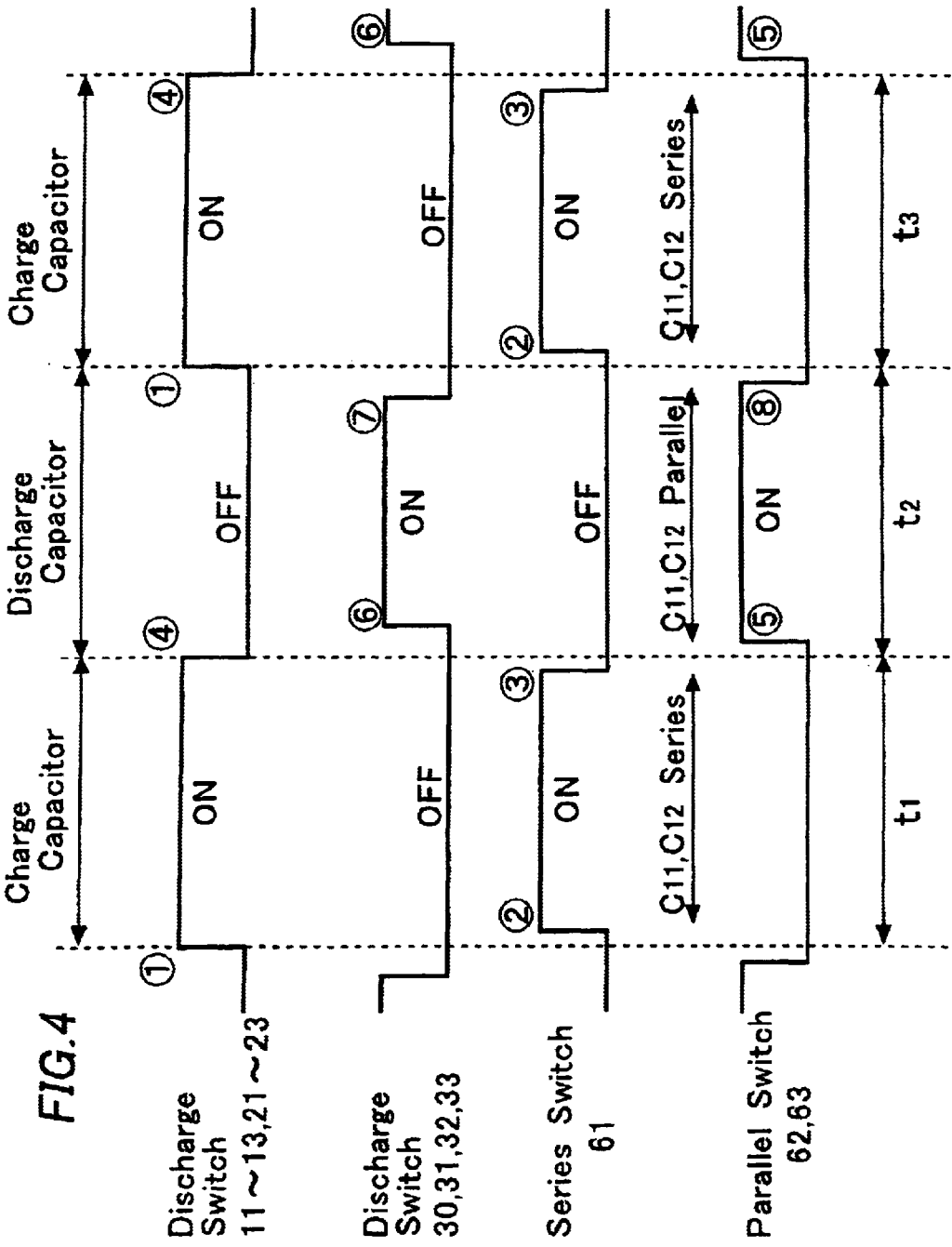
FIG. 4 is a timing chart to explain a second example of operation of the DC—DC converter according to the first embodiment of the invention.

Next, a second example of operation of the switched capacitor type DC—DC converter of the configuration described above will be explained referring to FIG. 1, FIG. 2 and FIG. 4. FIG. 4 is a timing chart to explain the second example of operation of the switched capacitor type DC—DC converter.

In the first embodiment described above, the switches are turned simultaneously. However, a reverse current could flow if there is a time lag among the switches. For instance, if the charging switches 11–13 and 21–23 are turned ON while the discharging switches 30–33 are ON, a reverse current flows into the power supply Vdd through the switches 11–13, resulting in a voltage drop of the boosted voltage. This leads to deterioration in the efficiency of the DC—DC converter. An improper current flows also if the switches 30–33 are turned ON before the charging switches 11–13 and 21–23 are turned OFF. Regarding to relationship between the switch 61 and the switches 62 and 63, if all of them are ON at the same time, an improper current flows to the ground (0V), resulting in a voltage drop of the boosted voltage and deterioration in the efficiency of the DC—DC converter.

Therefore, in order to avoid such a reverse current, it is necessary that the switches 30–33 and 61–63 be OFF when the switches 11–13 and 21–23 are turned ON.

Control steps of the switches will be explained hereafter referring to FIG. 1, FIG. 2 and FIG. 4. At first, the charging switches 11–13 and 21–23 are turned ON (① in FIG. 4), while all other switches are OFF. Then the switch 61 is turned ON to connect the capacitors C11 and C12 in series (② in FIG. 4). With this, the capacitors C11, C12, C2 and C3 are charged by a current from the power supply Vdd. The capacitors C11 and C12 are charged while connected in series (the configuration shown in FIG. 1).

Next, the switch 61 is turned OFF (③ in FIG. 4) to disconnect the capacitors C11 and C12. After that, the charging switches 11–13 and 21–23 are turned OFF (④ in FIG. 4).

Then the switches 62 and 63 are turned ON to connect the capacitors C11 and C12 in parallel (⑤ in FIG. 4). Next, the discharging switches 30–33 are turned ON (⑥ in FIG. 4) to boost the voltage V1 at the Vdd side end of the capacitor C11 to 0.5 Vdd by the capacity coupling effect. This is because the supply voltage Vdd is added to the voltage 0.5 Vdd at the connecting node of the capacitor C11 and the capacitor C12. Similarly, the voltage V2 is boosted to 2.5 Vdd and the voltage V3 (=Vout) is boosted to 3.5 Vdd due to the capacity coupling effect (a status shown in FIG. 2). Then the discharging switches 30–33 are turned OFF (⑦ in FIG. 4). And then the switches 62 and 63 are turned OFF (⑧ FIG. 4). The boosting operation is done without incurring the reverse current by repeating the steps described above.

Figure 5:
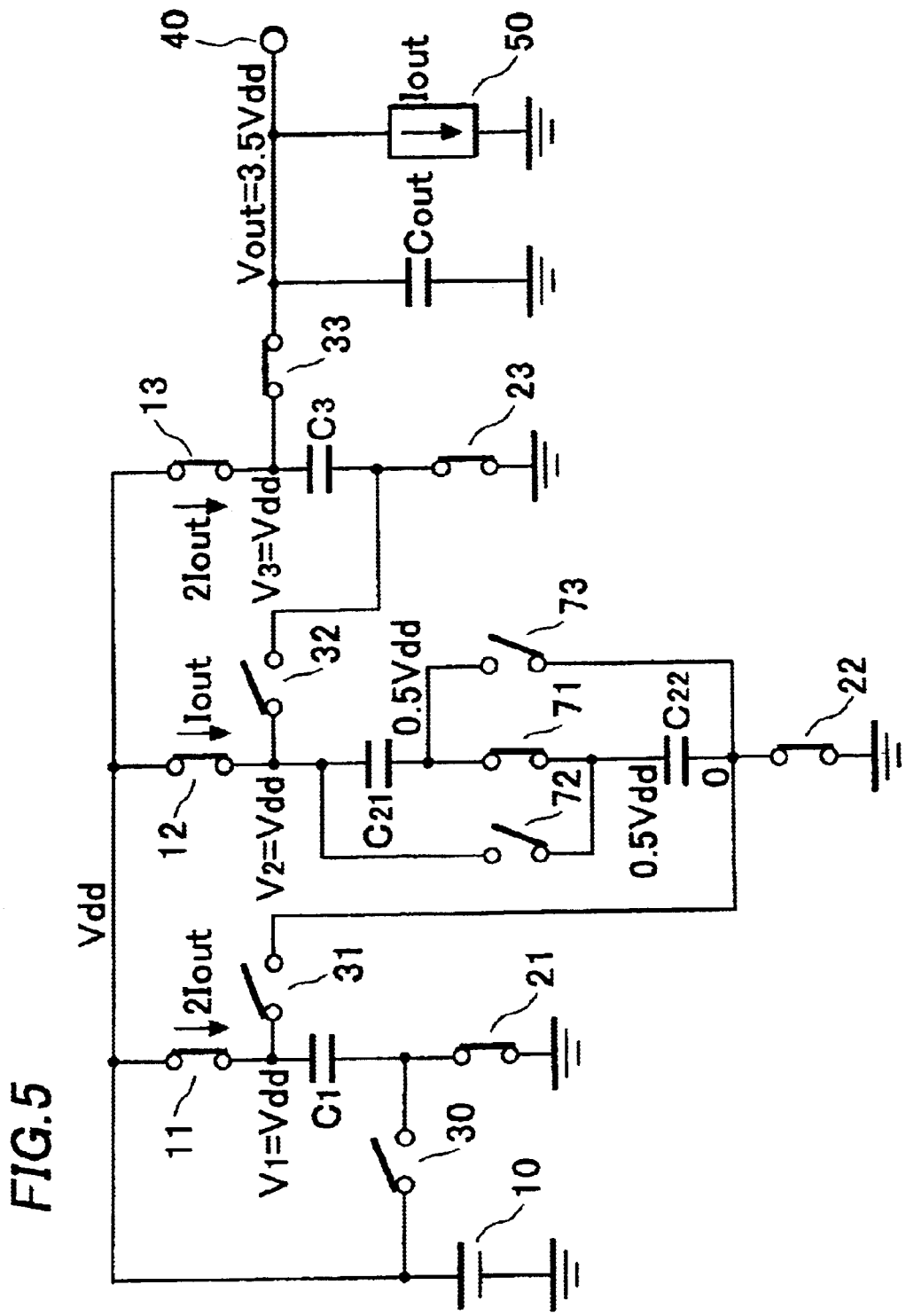
FIG. 5 is a circuit diagram showing a DC—DC converter according to a second embodiment of the invention.
Figure 6:
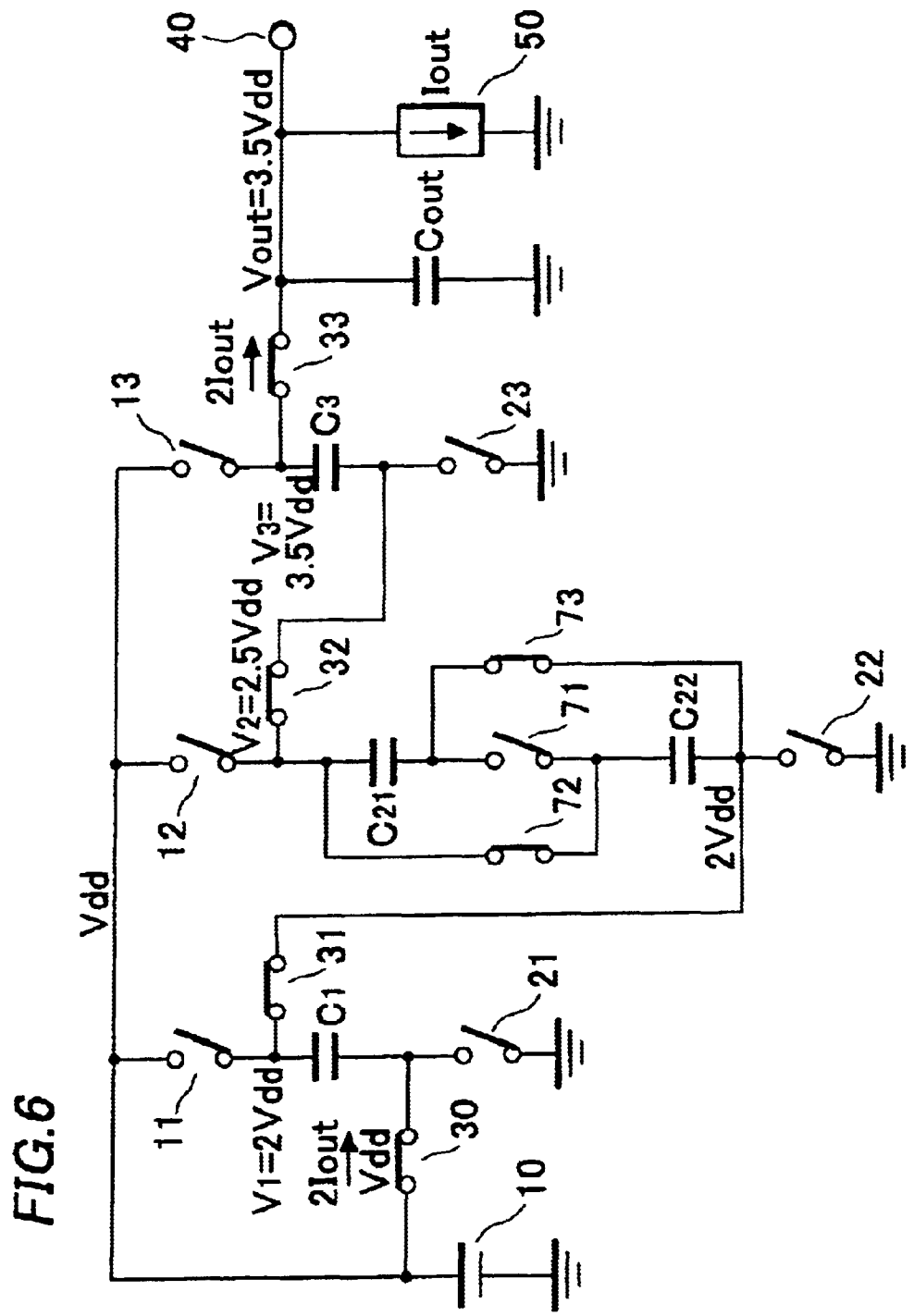
FIG. 6 is a circuit diagram showing the DC—DC converter according to the second embodiment of the invention.

FIG. 5 and FIG. 6 are circuit diagrams showing a three-stage switched capacitor type DC—DC converter according to a second embodiment of the invention. This switched capacitor type DC—DC converter has series/parallel capacitors C21 and C22 in the second stage. Switches 71, 72 and 73 alternate connection of capacitors C21 and C22 in series and in parallel. The rest of the configuration is the same as in the first embodiment.

The operation of this switched capacitor type DC—DC converter is similar to that of the first embodiment. As shown in FIG. 5, switches 11–13 and the switches 21–23 are turned ON and the switches 30–33 are turned OFF. At the same time the switch 71 is turned ON and the switches 72 and 73 are turned OFF.

Then the capacitors C21 and C22 are connected in series between the power supply Vdd and the ground (0V), and charging takes place. The capacitors C1 in the first stage and C3 in the third stage are connected in parallel between the power supply Vdd and the ground (0V), and charging takes place.

A voltage V0 at a connecting node of the capacitors C21 and C22 becomes 0.5 Vdd, while a voltage V2 at the Vdd side end of the capacitor C21 becomes Vdd. That is to say, each of the capacitors C21 and C22 is charged to 0.5 Vdd, assuming that the capacitors C21 and C22 are equal in capacitance.

Both a voltage V1 across the capacitor C1 and a voltage V3 across the capacitor C3 are Vdd. Given an output current from the output terminal 40 is Iout, a charging current to C21 and C22 is Iout, and each of a charging current to C1 and a charging current to C3 is 2 Iout.

Next, the switches 11–13 and the switches 21–23 are turned OFF and the switches 30–33 are turned ON. At the same time, the switch 71 is turned OFF and the switches 72 and 73 are turned ON, as shown in FIG. 6.

Then the capacitors C21, C22, C1 and C3 are disconnected from the power supply Vdd and the ground (0V). At the same time, the capacitors C21 and C22 connected in parallel with each other, the capacitor C1 and the capacitor C3 are connected in series, and discharging takes place.

The voltage V1 at the Vdd side end of the capacitor C1 becomes 2 Vdd due to a capacity coupling effect. The voltage V2 in the second stage becomes 2.5 Vdd. This is because the voltage V1 is added to the voltage 0.5 Vdd at the connecting node of the capacitor C21 and the capacitor C22. Similarly, the voltage V3 (=Vout) is boosted to 3.5 Vdd due to the capacity coupling effect.

Given the output current from the output terminal 40 is Iout, a current from the power supply Vdd to the capacitor C1 is 2 Iout. This current determines the efficiency. Thus following equations hold under the same conditions as in the first embodiment.

Input power=(3=2 Iout+Iout)/2×Vdd=Iout×3.5 Vdd
Output power=Iout×3.5 Vdd
Therefore, the theoretical efficiency η is 100%.

The explanation above shows that the same result is obtained regardless in which stage the series/parallel capacitors are disposed. The same timing control as described in the first embodiment (refer to FIG. 4) should be applied to the second embodiment, in order to avoid a reverse current.

Figure 7:
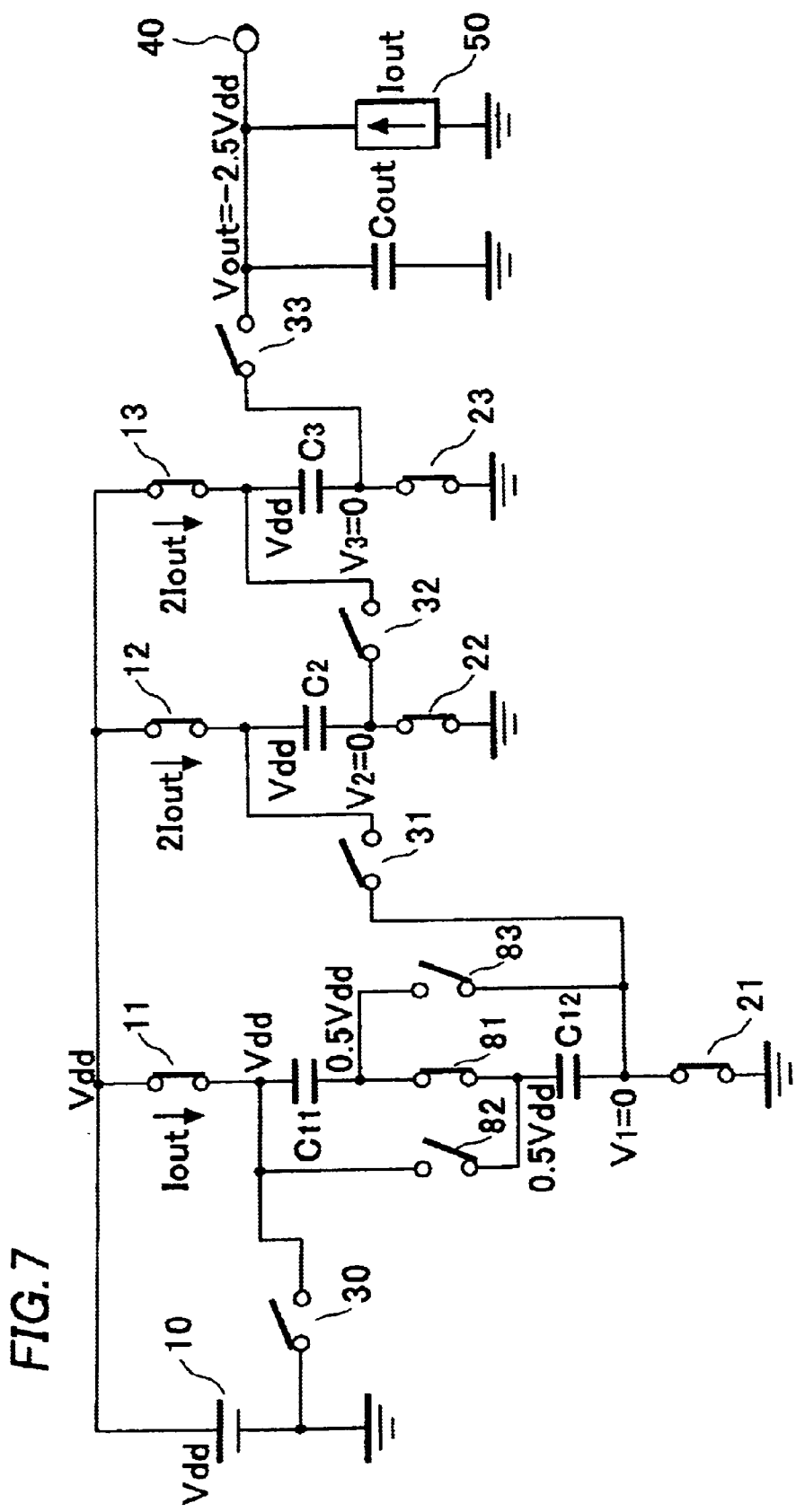
FIG. 7 is a circuit diagram showing the DC—DC converter according to a third embodiment of the invention.
Figure 8:
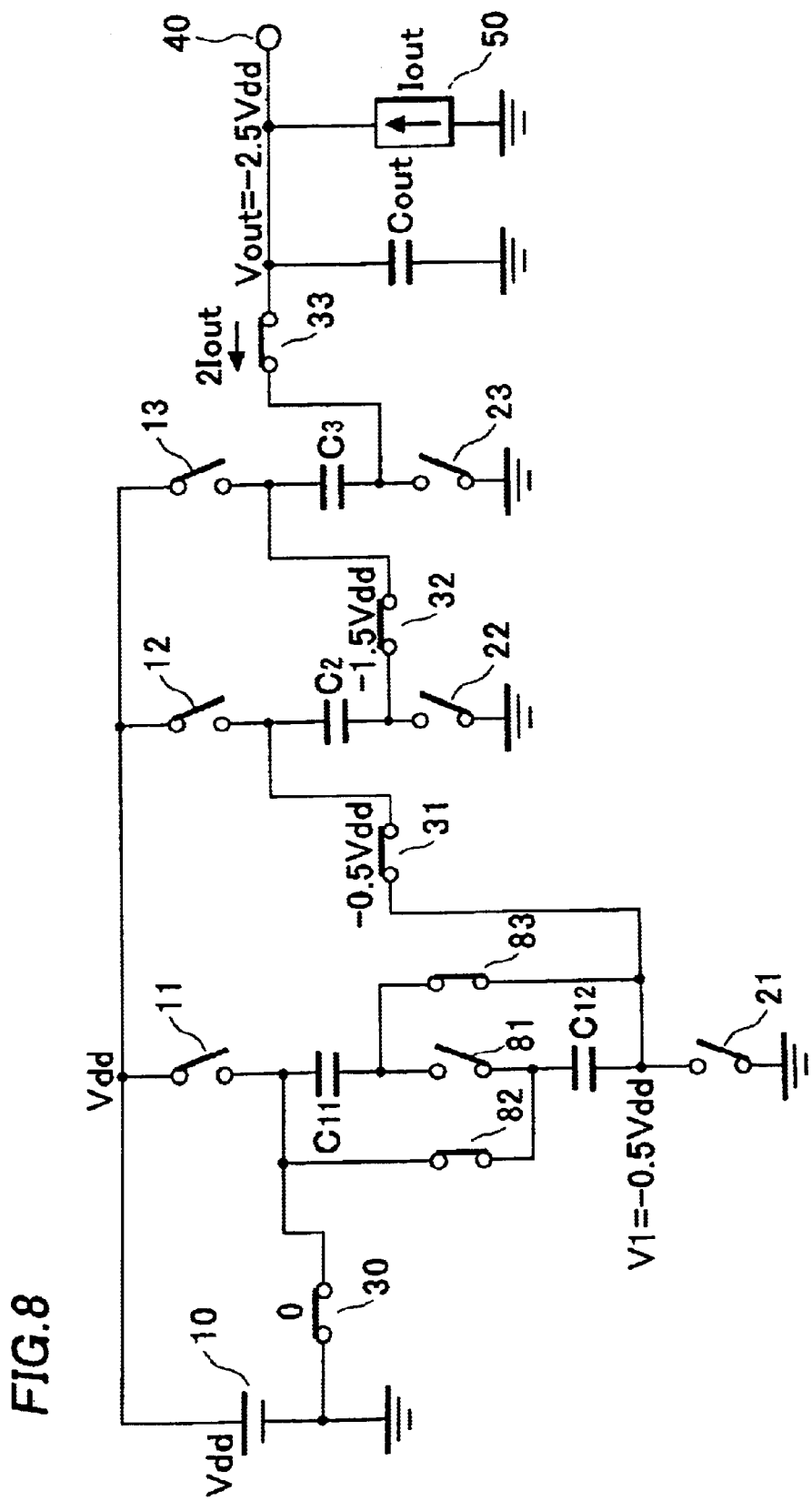
FIG. 8 is a circuit diagram showing the DC—DC converter according to the third embodiment of the invention.
Figure 9:
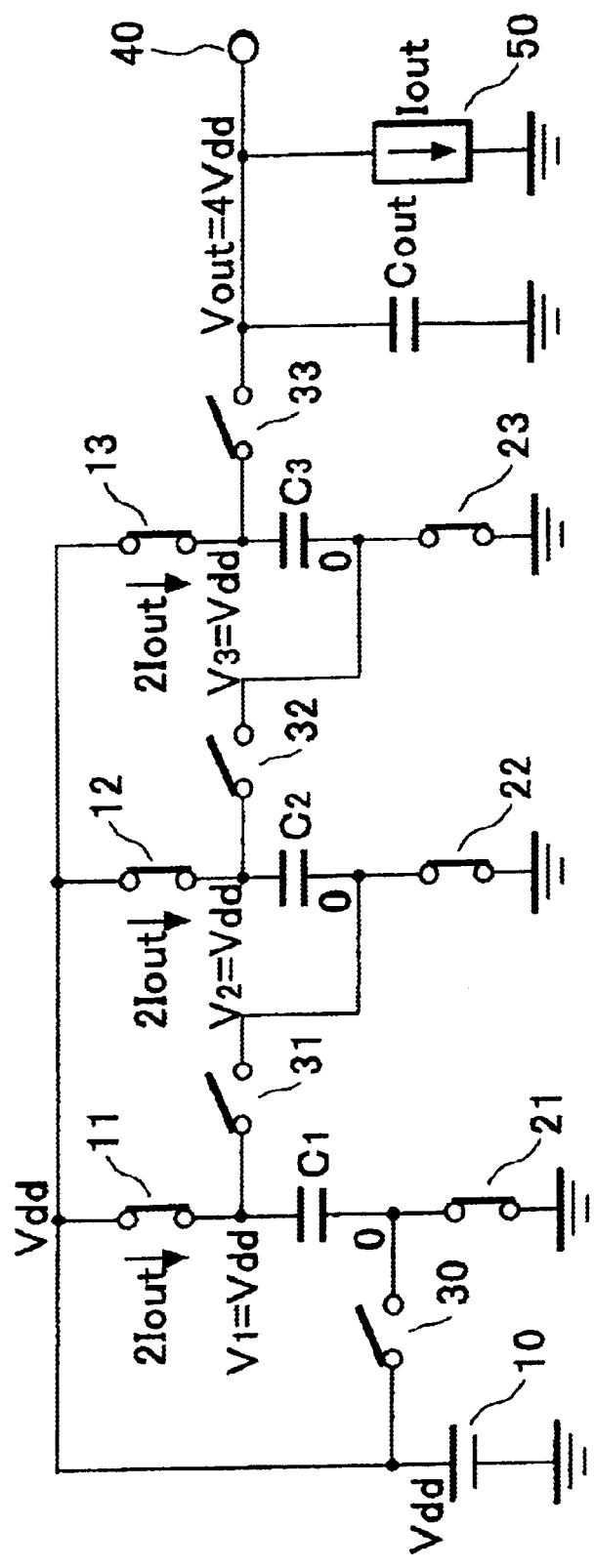
FIG. 9 is a circuit diagram showing a DC—DC converter according to a conventional art.
Figure 10:
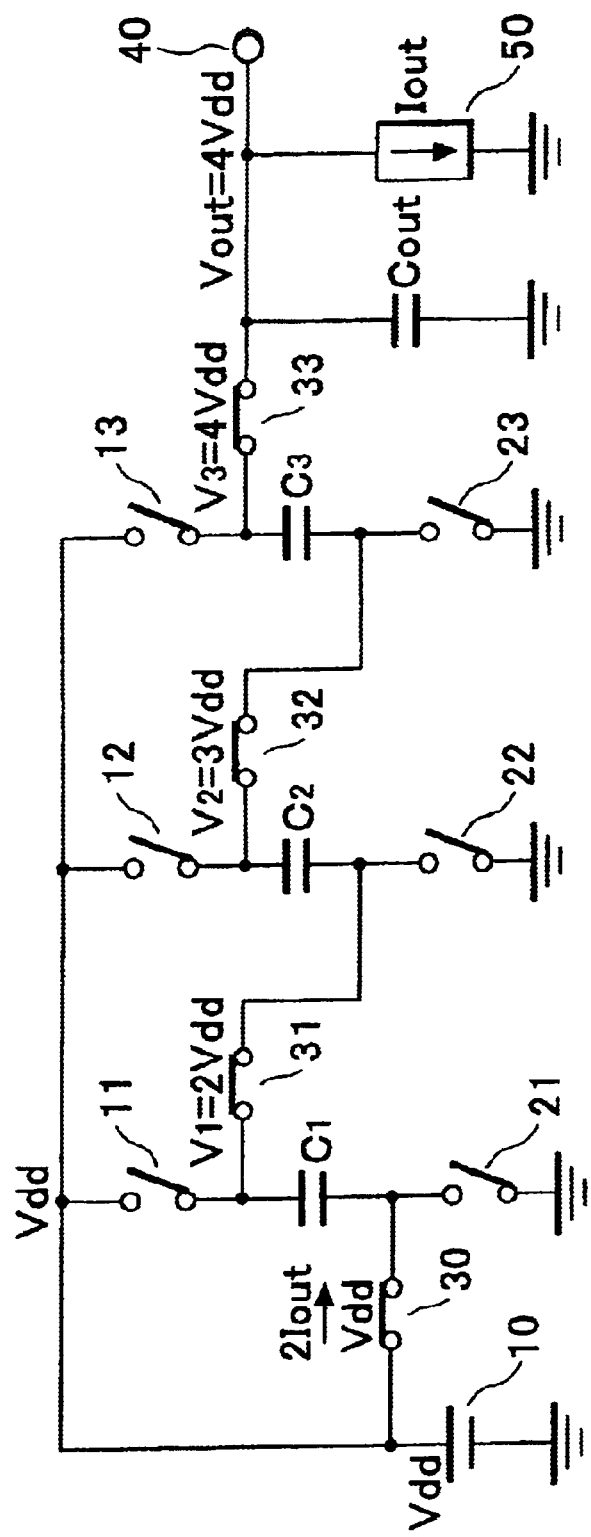
FIG. 10 is a circuit diagram showing the DC—DC converter according to the conventional art.

Next, a third embodiment of the invention will be explained referring to FIG. 7 and FIG. 8. A DC—DC converter of the third embodiment generates a negative boosted voltage, while the first and the second embodiments generate positive boosted voltages.

A voltage source 10 provides a supply voltage Vdd. Switches 81, 82 and 83 alternate connection of capacitors C11 and C12 in series and in parallel. When the switch 81 is ON and the switches 82 and 83 are OFF, the capacitors C11 and C12 are connected in series. The capacitors C11 and C12 are connected in parallel when the switch 81 is OFF and the switches 82 and 83 are ON. A switch 11 is disposed between the power supply Vdd and one end of the capacitor C11. A switch 21 is disposed between the ground (0V) and one end of the capacitor C12.

Capacitors C2 and C3 compose a second stage and a third stage of the DC—DC converter respectively. Switches 12 and 13 are disposed between the power supply Vdd and one end of each of the capacitors C2 and C3 respectively. Switches 22 and 23 are disposed between the ground (0V) and the other end of each of the capacitors C2 and C3 respectively.

The configuration described so far is the same as that of the first embodiment, but different in the followings. A switch 30 is disposed between the power supply Vdd and the power supply (Vdd) side end of the capacitor 12. A switch 31 is disposed between the ground (0V) side end of the capacitor C11 and the power supply (Vdd) side end of the capacitor C2 of the second stage. A switch 32 is disposed between the ground (0V) side end of the capacitor C2 and the power supply (Vdd) side end of the capacitor C3 of the third stage. A switch 33 is disposed between the ground (0V) side end of the capacitor C3 and an output terminal 40.

An output capacitance Cout and a current load 50 are connected to the output terminal 40, as in the first embodiment.

Operation of this switched capacitor type DC—DC converter will be understood in the same way as the first and the second embodiments. The switches 11–13 and the switches 21–23 are turned ON and the switches 30–33 are turned OFF. At the same time the switch 81 is turned ON and the switches 82 and 83 are turned OFF as shown in FIG. 6.

Then the capacitors C11 and C12 are connected in series between the power supply Vdd and the ground (0V), and charging takes place. The capacitor C2 in the second stage and the capacitor C3 in the third stage are connected in parallel between the power supply Vdd and the ground (0V), and charging takes place.

A voltage V0 at a connecting node of the capacitors C11 and C12 becomes 0.5 Vdd, while a voltage V1 at the ground (0V) side end of the capacitor C12 becomes ground voltage (0V). That is to say, each of the capacitors C11 and C12 is charged to 0.5 Vdd, assuming that the capacitors C11 and C12 are equal in capacitance. Given an output current from the output terminal 40 is Iout, a charging current to C11 and C12 is Iout, and each of a charging current to C2 and a charging current to C3 is 2 Iout.

Next, the switches 11–13 and the switches 21–23 are turned OFF and the switches 30–33 are turned ON. At the same time, the switch 81 is turned OFF and the switches 82 and 83 are turned ON, as shown in FIG. 8.

Then the capacitors C11, C12, C2 and C3 are disconnected from the power supply Vdd and the ground (0V). At the same time, the capacitors C11 and C12 connected in parallel with each other, the capacitor C2 and the capacitor C3 are connected in series, and discharging takes place.

The voltage V1 at the ground (0V) side end of the capacitor C12 becomes −0.5 Vdd due to the capacity coupling effect. This is because the voltage at the power supply (Vdd) side end of the capacitor C11 is changed from Vdd to 0V. A voltage V2 of the second stage becomes −1.5 Vdd. This is because the capacity coupling effect caused by a change in the voltage at the power supply (Vdd) side end of the capacitor C2 from Vdd to −0.5 Vdd. And then the voltage V3 of the third stage becomes −2.5 Vdd. This is due to the capacity coupling effect caused by a change in the voltage at the power supply (Vdd) side end of the capacitor C3 from Vdd to −1.5 Vdd.

Thus an output voltage Vout=−2.5 Vdd is obtained at the output terminal 40.

Following equations hold under the same conditions as in the first embodiment.

Input power=(2×2 Iout+Iout)/2×Vdd=Iout×2.5 Vdd
Output power=Iout×2.5 Vdd
Therefore the theoretical efficiency η is 100%. The same timing control as described in the first embodiment (refer to FIG. 4) should be applied to this embodiment, in order to avoid a reverse current.

A DC—DC converter capable of generating output voltages in increments less than the power supply voltage Vdd, such as 1.5 Vdd, 2.5 Vdd, 3.5 Vdd and so on, is provided according to this invention. Deterioration in efficiency due to a reverse current can be prevented.

The efficiency of a power supply circuit is significantly improved, when the DC—DC converter of this invention is applied to the power supply circuit.

What is claimed is:

1. A control method of a DC—DC converter having one or more than one stage comprising a first capacitor, a first switch to connect the first capacitor to a voltage source to charge, and a second switch to connect the first capacitor to an output terminal or to a capacitor in a next stage in series to discharge and at least one stage comprising a plurality of second capacitors, the first switch to connect the second capacitors to the voltage source to charge, the second switch to connect the second capacitors to an output terminal or to a capacitor in a next stage to discharge, a third switch to connect the second capacitors in series, and a fourth switch to connect the second capacitors in parallel, said control method comprising turning the first switch ON and OFF, while the second, third and fourth switches are OFF.

2. A control method of a DC—DC converter of claim 1, wherein said second capacitors have equal capacitance to each other.

3. A control method of a DC—DC converter of claim 1, wherein said first, second, third and fourth switches are made of MOS transistors.

4. A control method of a DC—DC converter having one or more than one stage comprising a first capacitor, a first switch to connect the first capacitor to a voltage source to charge, and a second switch to connect the first capacitor to an output terminal or to a capacitor in a next stage in series to discharge and at least one stage comprising a plurality of second capacitors, the first switch to connect the second capacitors to the voltage source to charge, the second switch to connect the second capacitors to an output terminal or to a capacitor in a next stage to discharge, a third switch to connect the second capacitors in series, and a fourth switch to connect the second capacitors in parallel, said control method comprising:

turning the first switches ON to charge the first and the second capacitors, following a status in which the first, second and third switches are OFF;

turning the third switch ON to connect the second capacitors in series;

turning the third switch OFF;

turning the first switch OFF;

turning the fourth switch ON to connect the second capacitors in parallel;

turning the second switch ON to discharge the first and the second capacitors;

turning the second switch OFF;

turning the second switch OFF; and repeating eight steps mentioned above to boost the voltage.

5. A control method of a DC—DC converter of claim 4, wherein said second capacitors have equal capacitance to each other.

6. A control method of a DC—DC converter of claim 4, wherein said first, second third and fourth switches are made of MOS transistors.

* * * * *